United States Patent
Li et al.

(10) Patent No.: US 11,691,108 B1
(45) Date of Patent: Jul. 4, 2023

(54) GAS SEPARATION MEMBRANE MODULE WITH HOLLOW FIBER CARBON MOLECULAR SIEVE MEMBRANES

(71) Applicant: L'Air Liquide, Societe Anonyme pour l'Etude et l'Exploitation des Procedes Georges Claude, Paris (FR)

(72) Inventors: Tao Li, Garnet Valley, PA (US); Raja Swaidan, Lincoln University, PA (US); Robert A. Gagliano, Landenburg, PA (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/567,048

(22) Filed: Dec. 31, 2021

(51) Int. Cl.
  *B01D 53/22* (2006.01)
  *B01D 63/02* (2006.01)
  *B01D 71/02* (2006.01)

(52) U.S. Cl.
  CPC .......... *B01D 63/02* (2013.01); *B01D 53/225* (2013.01); *B01D 71/021* (2013.01); *B01D 2053/224* (2013.01); *B01D 2313/04* (2013.01); *B01D 2313/143* (2013.01); *B01D 2313/146* (2013.01); *B01D 2313/20* (2013.01); *B01D 2313/21* (2013.01)

(58) Field of Classification Search
  CPC .......... B01D 2053/224; B01D 2313/20; B01D 71/021; B01D 63/02; B01D 2313/21; B01D 53/225; B01D 2313/143; B01D 2313/146; B01D 2313/04
  See application file for complete search history.

(56) References Cited

U.S. PATENT DOCUMENTS

| | | | | |
|---|---|---|---|---|
| 3,616,929 A | * | 11/1971 | Manjikian | B01D 63/065 210/497.1 |
| 3,720,658 A | | 3/1973 | Goldberg et al. | |
| 4,547,289 A | * | 10/1985 | Okano | B01D 65/102 210/321.89 |
| 2002/0003105 A1 | * | 1/2002 | McEvoy | B01D 63/043 210/497.1 |
| 2006/0125187 A1 | * | 6/2006 | Bartlett | B01D 63/082 277/315 |
| 2010/0107880 A1 | * | 5/2010 | Sekiguchi | B01D 63/021 96/8 |

(Continued)

*Primary Examiner* — Anthony R Shumate
(74) *Attorney, Agent, or Firm* — Christopher J. Cronin; Allen E. White (57) ABSTRACT

A CMS membrane module includes plurality of hollow fiber CMS membranes that are enclosed within an open cylindrical shell whose ends are embedded in tubesheets. The shell is concentrically disposed within an open cylindrical pressure vessel whose open ends are covered by and secured by end caps. The shell includes a feed fluid inlet formed therein between the tubesheets and a retentate outlet in between one of the tubesheets and an adjacent end cap. A retentate seal is formed between the shell and the pressure vessel at a position between the tubesheets. A permeate seal is formed between the pressure vessel and the tubesheet that is adjacent a permeate port of the module. A structure made up of the CMS membranes, shell, tubesheets, and seals is slidable within the pressure vessel and not fixed in place in relation to the pressure vessel and end caps.

20 Claims, 3 Drawing Sheets

(56) References Cited

U.S. PATENT DOCUMENTS

| | | | |
|---|---|---|---|
| 2011/0203458 A1* | 8/2011 | Smith | B01D 53/268 |
| | | | 285/272 |
| 2015/0136689 A1* | 5/2015 | Butters | F16J 15/022 |
| | | | 277/626 |
| 2016/0023164 A1* | 1/2016 | Karode | B01D 53/227 |
| | | | 29/401.1 |
| 2016/0193570 A1* | 7/2016 | Kobayashi | B01D 63/043 |
| | | | 210/232 |
| 2017/0001148 A1* | 1/2017 | Kulkarni | B01D 53/228 |
| 2017/0001149 A1* | 1/2017 | Kulkarni | B01D 63/10 |
| 2017/0113181 A1* | 4/2017 | Sinstedten | B01D 53/268 |
| 2017/0136412 A1* | 5/2017 | Huda | C02F 1/441 |
| 2017/0136415 A1* | 5/2017 | Requate | B01D 63/022 |
| 2017/0348643 A1* | 12/2017 | Noguchi | B01D 65/08 |

\* cited by examiner

GAS SEPARATION MEMBRANE MODULE WITH HOLLOW FIBER CARBON MOLECULAR SIEVE MEMBRANES

CROSS-REFERENCE TO RELATED APPLICATIONS

None.

BACKGROUND

Field of the Invention

The present invention relates to improved structures for carbon molecular sieve (CMS) membrane-based gas separation modules, otherwise known as CMS membrane modules.

Related Art

Polymeric membranes and CMS membranes for fluid separations are typically enclosed in a pressure vessel so as to isolate the fluid being separated from the ambient.

Several have proposed module designs.

U.S. Pat. No. 3,702,658 disclosed an improved support for a tubesheet under shell feed pressure with an inert, porous and non-compressible material (such as epoxy resin bonded sand). The support conveys effluent from fiber lumens to the port of the vessel and to support the tubesheet against differential pressure. Dimensional and relative positional changes of the tubesheets involved in creep and plastic deformation under pressure are avoided.

In a single-ended shell feed module design illustrated in U.S. Pat. No. 3,702,658, a tubesheet is formed on one end of membrane fiber. The structure is then encased in a vessel to make a shell feed module. There is no rigid structure to enclose the fibers for protection when a tubesheet is potted on one end of the fiber. While such protection might not be necessary for polymer fiber membranes, it is very important for the relatively brittle (in comparison to polymeric fiber membranes) CMS fiber membrane to survive the handling during the tubesheet potting process. Also, the supported tubesheet is locked in place between vessel and cap. The closed fibers on the other end hang free without a second tubesheet to hold it together for structural integrity.

In two related publications (Xuezhong He, hollow fiber carbon molecular sieve membranes, in Encyclopedia of Membranes, E. Droli, L. Giorno (eds), Springer-Verlag, Berlin, Heidelberg, 2014 and Xuezhong He, May-Britt Hagg, Hollow fiber carbon membranes: From material to application, Chemical Engineering Journal, 215-216 (2013), 440-448), CMS fibers are enclosed in an acrylonitrile-butadiene-styrene (ABS) shell. There are three circular disks attached to the ABS shell: one in the middle, and one each on two ends. Two external vessels, one with feed port and the other with retentate port, enclose the ABS shell and butt to the circular disk in the middle of the ABS shell and are bolted together. The other ends of the two vessels are bolted to two separate caps on two ends of ABS shell.

There are several drawbacks to the approaches of these two related publications. Even a slight mismatch in the dimension between the length of the external vessel and the location of three circular disks on the ABS shell could cause stresses in the bonding between the disk and ABS shell. These stresses could result in separation of the disk from the shell. Any separation would cause a leak and intermixing of feed and permeation and feed and retentate. Also, upon final assembly, the ABS shell enclosing the fibers is mechanically locked in place and cannot move or slide inside the vessel. If the disk and tubesheet on permeation end is not supported properly, the lack of movement could prevent them from sliding to the support and result in severe stresses in tubesheet and in bonding between the disk and shell to result in possible tubesheet failure and separation of disk from the ABS shell. Moreover, the coefficient of thermal expansion (CTE) of the ABS shell (believed to be 101 ppm/m/° C.) is much higher than that of CMS (around 5 ppm/m/° C.) and epoxy (around 60 ppm/m/° C.) in the tubesheet. A mismatch in CTE between ABS shell and tubesheet could cause them to separate. The separation would cause leakage between feed and permeate. Separation would also create cavities in the tubesheet which are stress concentrators. The stress concentrators could accelerate possible crack propagation and premature tubesheet failure.

Current commercial shell-fed polymeric hollow fiber membrane modules for gas separation typically include a hollow center tube with holes, two end tubesheets, and a vessel. The hollow fiber is tightly wrapped around the center tube to desired packing density. The ends of the fiber in one tubesheet are machined open and the tubesheet is termed a permeate tubesheet. On the other hand, the fiber ends in the other tubesheet are closed and sealed and the tubesheet is termed a nub, cap, or retentate tubesheet. The holes in the center tube are along the entire length in cross flow module, however, in counter-current flow module, on the holes in the center tube are present only near the retentate tubesheet.

For many commercial cross flow modules, the feed gas travels radially inward across tightly packed hollow fiber membranes. Some gas permeates through a wall of the hollow fiber from the external surface to the internal bore and travels down the bore in a direction from the retentate tubesheet towards the permeation tubesheet to reach the open ends in the permeate tubesheet and is piped out. On the other hand, the retentate reaches the holes in the center tube, travels inside the hollow center tube in a direction from the permeate tubesheet to towards the nub tubesheet and is piped out through retentate port.

For many commercial counter-current flow modules, a non-permeable, flexible polymer film is wrapped around the tightly packed hollow fiber membranes on the outside. The film starts from the nub tubesheet and stops at a short distance from the permeation tubesheet. As feed gas is supplied to the vessel through the feed port, it reaches the membrane fiber through the gap between the non-permeable wrap and the permeate tubesheet. The feed gas is then forced to travel outside the fiber in a direction from the permeate tubesheet towards the retentate tubesheet under the wrap. The retentate reaches the holes in the center tube close to the retentate tubesheet, travels inside the hollow center tube and is piped out. Some gas permeates across the wall of the fiber from the external surface to the internal bore, travels inside the fiber bore in a direction from the retentate tubesheet towards the permeate tubesheet to reach open ends of fiber in the permeate tubesheet and is piped out through the permeate port. Because the feed gas and the permeate gas travel in opposite directions, this type of module design is named counter-current flow.

In both cross flow and counter-current flow hollow polymeric fiber membrane modules, the feed gas supplied through the feed gas port on the pressure vessel and the retentate collected at the hollow center tube are physically separated by the tightly packed polymer fiber membrane around the center tube.

In contrast, in known CMS membrane modules, there is no center tube and the rigid fibers cannot be packed tightly easily, especially without damaging them.

Thus, there is a need for a new structure for counter-current flow CMS membrane modules without a center tube.

SUMMARY

There is disclosed a counter-current flow CMS membrane module, comprising: a hollow, cylindrical pressure vessel having first and second open ends, an open feed port formed therein at a position closer to the second pressure vessel end than the first pressure vessel end; a first end cap covering and attached to the first open end of the pressure vessel, the first end cap having an open retentate port formed therein; a second end cap covering and attached to the second open end of the pressure vessel, the second end cap having an open permeate port formed therein; a hollow cylindrical shell having first and second sides and being concentrically disposed within the pressure vessel; a plurality of hollow fiber CMS membranes enclosed by the shell extending at least from the first end of the shell to the second end of the shell; a first cylindrical tubesheet of a material, that includes a cured polymer, that is formed around the first end of the shell and encapsulating portions of the CMS membranes that are adjacent the first end of the shell, the first tubesheet closing off open ends of the CMS membranes adjacent the first end of the shell; a first seal disposed between an inner surface of the pressure vessel and an outer circumferential surface of the shell closer to the first end thereof than the second end thereof, the first seal comprising an O-ring that is adjacent the inner surface of the pressure vessel that rests in a grooved ring that is secured to an outer surface of the shell; a second cylindrical tubesheet of a material, that includes a cured polymer, formed around the second end of the shell and encapsulating portions of the CMS membranes that are adjacent the second end of the shell, the second tubesheet having being machined away at a face thereof adjacent the second end cap so as to expose open ends of the CMS membranes thereat; a porous support disposed between the second end cap and the machined away face of the second tubesheet; a second seal disposed between an inner surface of the pressure vessel and an outer circumferential surface of the second tubesheet, the second seal comprising an O-ring that is adjacent the inner surface of the pressure vessel that rests in a grooved ring that is secured to the outer circumferential surface of the second tubesheet. One or more openings are formed in the shell between the first and second seals to form a feed fluid inlet. One or more openings are formed in the shell between the first seal and the first tubesheet to form a retentate outlet.

There is also disclosed a method of separating a fluid using the above-described CMS membrane module. The method comprises the following steps. A feed fluid is fed to the feed port. A permeate fluid is withdrawn from the permeate port. A retentate fluid is withdrawn from the retentate port. In use: a feed fluid enters the pressure vessel via the feed port and travels through an annular space between an inner surface of the pressure vessel and an outer surface of the shell that extends between the first and second seals, the feed fluid enters the shell interior via the feed fluid inlet, some of the feed fluid permeates across walls of the CMS membranes and enters bores of the CMS membranes as permeate, the permeate travels down the bores of the CMS membranes towards the open ends of the CMS membranes, the permeate exits the open ends of the CMS membranes and exits the CMS membrane module via the porous support and permeate port, a remainder of the feed fluid flows between the CMS membranes towards the first end of the shell and exits the shell at the retentate outlet as retentate, and the retentate exits said CMS membrane module via the retentate port.

The above-described CMS membrane module and method of separating a fluid may include one or more of the following aspects:

- the seals are slidable along the inner surface of the pressure vessel and none of the tubesheets and seals are fixed in place in relation to the pressure vessel and end caps.
- a portion of the shell around which is formed the retentate tubesheet is made of a material that has an associated $CTE_{RS}$; a portion of the shell around which is formed the permeate tubesheet is made of a material that has an associated $CTE_{PS}$; the material of the first tubesheet has an associated $CTE_{RTS}$; the material of the second tubesheet has an associated $CTE_{PTS}$; a difference between $CTE_{RS}$ and $CTE_{RTS}$ is no more than 45 ppm/° C.; and a difference between $CTE_{PS}$ and $CTE_{PTS}$ is no more than 45 ppm/° C.
- a middle portion of the shell between the first and second tubesheets is made of a material having a $CTE_M$ that is lower than $CTER_S$ and $CTE_{PS}$.
- the shell is made of a material that has an associated $CTE_S$; the material of the retentate tubesheet has an associated $CTE_{RTS}$; the material of the permeate tubesheet has an associated $CTE_{PTS}$; a difference between $CTE_S$ and $CTE_{PTS}$ is no more than 45 ppm/° C.; and a difference between $CTE_S$ and $CTE_{PTS}$ is no more than 45 ppm/° C.
- the material of the shell is carbon fiber composite, glass fiber composite, pure metal, or a metal alloy.
- the material of the shell has a $CTE_S$ that is in the range of 5-35 ppm/° C.
- the material of the shell is carbon fiber composite or glass fiber composite.
- said module has no hollow center tube extending along an axis of the pressure vessel within the CMS membranes.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

The invention solves the problems associated with conventional counter-current flow CMS membrane modules by packing the CMS membranes in a rigid shell and allowing the structure made up of the shell, CMS membranes, retentate and permeate tubesheets, and retentate and permeate seals to be slidable within the pressure vessel. In contrast to typical known large polymeric membrane modules, there is no center tube extending along an axis of the module within the CMS membranes. As a result of the foregoing, the retentate and permeate tubesheets may be potted without damaging the CMS membranes to an unsatisfactory degree.

Figure 1:
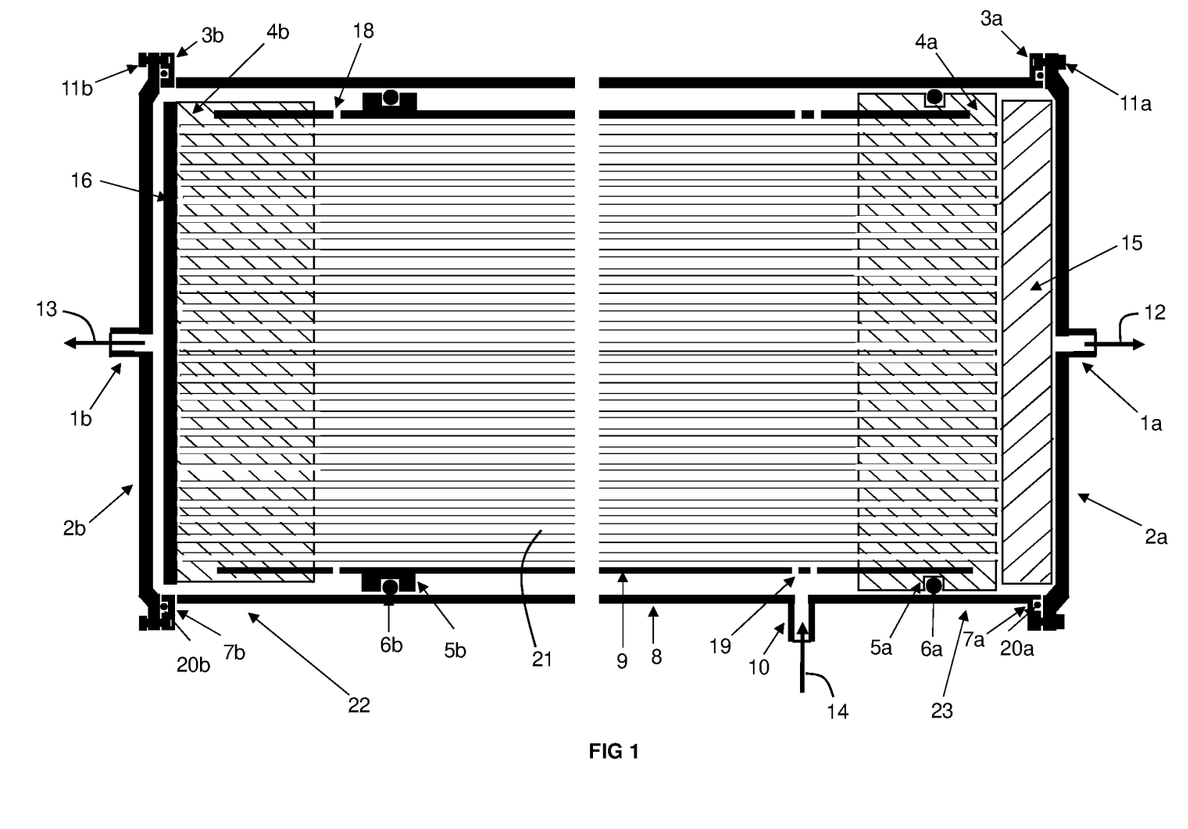
FIG. 1 is a cross-sectional schematic view of an embodiment of the CMS membrane module of the invention.

As best shown in FIG. 1, the counter-current flow CMS membrane module includes a hollow, cylindrical pressure vessel 8 having open ends. A retentate end cap 2b covers the open end of the retentate side of the pressure vessel 8 and has a retentate port 1b formed therein. The retentate end cap 2b is secured to the pressure vessel 8 with retentate end cap bolt 3b and retentate cap nut 11b. A permeate end cap 2a covers the open end of the permeate-side of the pressure vessel 8 and has a permeate port 1a formed therein. The permeate end cap 2a is secured to the pressure vessel 8 with permeate end cap bolt 3a and permeate cap nut 11a. The pressure vessel 8 and end caps 2a, 2b may be made of any material known for such purposes in the field of gas separation membrane technology. Any other technique or structure known for securing an end cap to a pressure vessel known in the field of gas separation membrane technology may be used as an alternative to the bolts 3a, 3b and nuts 11a, 11b. Collectively, each of pair of bolts 3a, 3b and nuts 11a, 11b and the alternatives are known as a retentate end cap fastening means and a permeate end cap fastening means.

Disposed concentrically within the pressure vessel 8 is a hollow, cylindrical shell 9. A plurality of hollow fiber CMS membranes 21 extend along the interior of the shell 9. The CMS membranes 21 may be made of any material known for such purposes in the field of gas separation membrane technology. Those skilled in the art will understand that they are made by at least partially pyrolyzing polymeric hollow fiber membranes. The shell 9 includes one or more openings at a position(s) in between a permeate tubesheet 4a (described below) and a retentate tubesheet 4b (described below) that form(s) a feed fluid inlet 19. In order to enhance the counter-current flow, the feed fluid inlet 19 is typically positioned in between a midpoint of the shell 9 and the permeate tubesheet 4a, and more typically positioned close to the permeate tubesheet 4a. The shell 9 also includes one or more openings at a position(s) in between a retentate seal (described below) and the retentate tubesheet 4b.

A retentate tubesheet 4b is formed around a first end 22 of the shell 9. The retentate tubesheet 4b encapsulates the portions of the CMS membranes 21 and closes off the otherwise-open ends of the CMS membranes 21 that are adjacent the first end 22 of the shell 9 so as to form a fluid-tight seal. Those skilled in the art will recognize that the retentate tubesheet 4b may also be referred to as a nub or cap. While the material making up the retentate tubesheet 4b may be any known in the field of gas separation membrane technology, typically the material is mainly comprised of a cured polymer, such as an epoxy, that is cured after "potting" the retentate tubesheet 4b.

Figure 2:
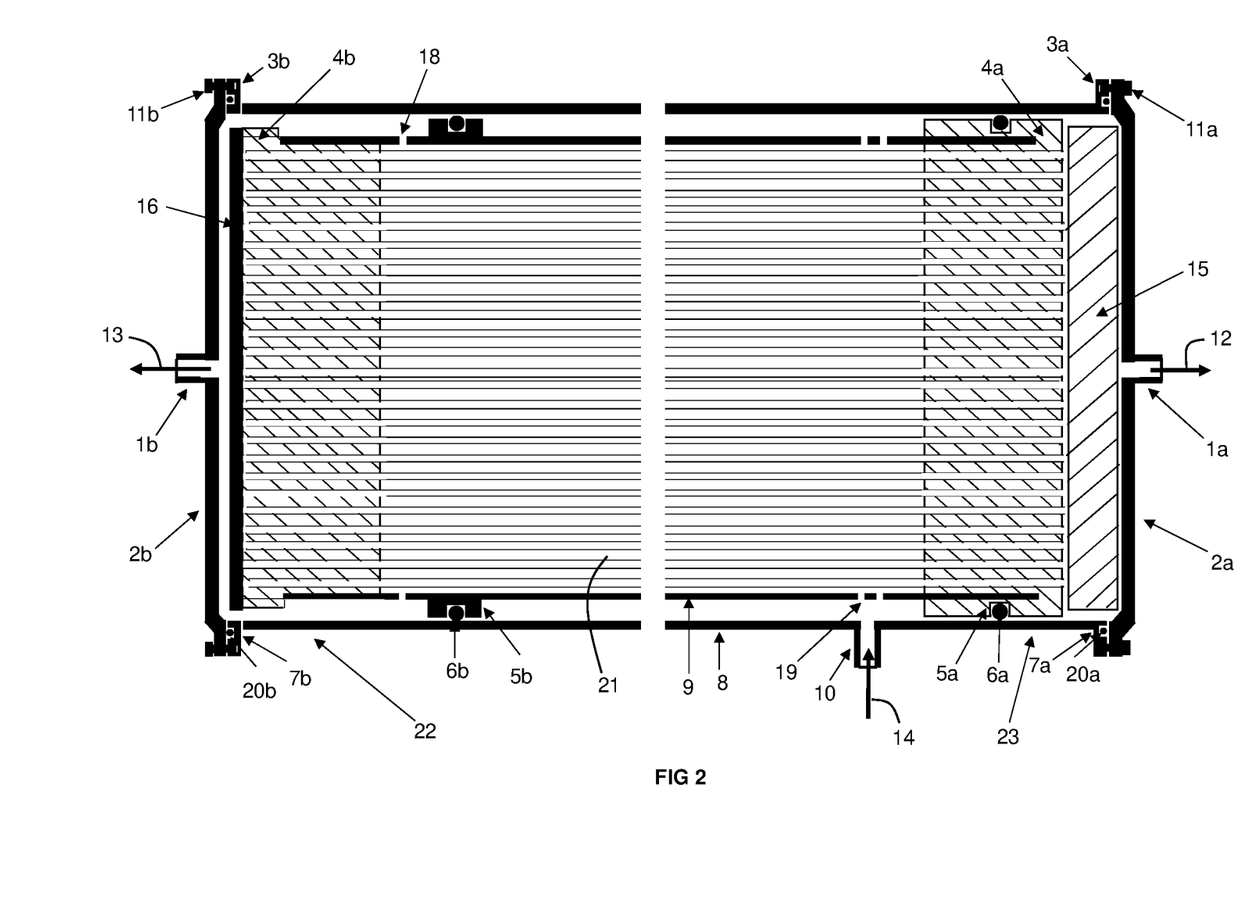
FIG. 2 is a cross-sectional schematic view of a variant of the CMS membrane module of FIG. 1.

The retentate tubesheet 4b is contiguous with at least portions of an inner circumferential surface of the shell 9 adjacent the first end 22 to form a gas-tight seal in between the retentate tubesheet 4b and the shell 9. In other words, gas is prevented from flowing in between the shell 9 and the retentate tubesheet 4b. Preferably, the retentate tubesheet 4b encapsulates not only the portions of the CMS membranes 21 that are adjacent the first end 22, it also encapsulates the portions of the shell 9 adjacent the first end 22 so that the retentate tubesheet 4b is contiguous with portions of the inner circumferential surface of the shell 9 adjacent the first end 22, with portions of the outer circumferential surface of the shell 9 adjacent the first end 22, and with an end face of the shell 9 adjacent the first end 22. Alternatively and as best shown in FIG. 2, the retentate tubesheet 4b does not encapsulate the portions of the shell 9 adjacent the first end 22. While it is still contiguous with an inner circumferential surface of the shell 9 adjacent the first end 22, the opposite facing outer circumferential surface of the shell 9 adjacent the first end 22 is not in contact with the material of the retentate tubesheet 4b. In other words, there is cured polymer forming the tubesheet on the inside of the shell 9 adjacent the first end 22 but not around the outside of the shell adjacent the first end 22. This alternative configuration may be formed by potting the retentate tubesheet 4b so as to encapsulate portions of the shell 9 adjacent the first end 22 followed by machining away of portions of the retentate tubesheet 4b that are adjacent to the outer circumferential surface of the shell 9.

With reference to FIG. 1, a permeate tubesheet 4a encapsulates portions of the shell 9 that are adjacent the second end 23 and also the portions of the CMS membranes 21 that are adjacent the second end 23. In contrast to the retentate tubesheet 4b, it does not close off the open ends of the CMS membranes 21 that are adjacent the second end 23 of the shell 9. This is because, after the permeate tubesheet 4a is initially formed and cured, a planar face thereof adjacent the second end 23 is machined away so as to expose the bores of the CMS membranes 21. While the material making up the permeate tubesheet 4a may be any known in the field of gas separation membrane technology, typically the material is mainly comprised of an epoxy that is cured after "potting" the permeate tubesheet 4a.

The permeate tubesheet 4a is contiguous with at least portions of an inner circumferential surface of the shell 9 adjacent the second end 23 to form a gas-tight seal in between the permeate tubesheet 4a and the shell 9. In other words, gas is prevented from flowing in between the shell 9 and the permeate tubesheet 4a. Preferably, the permeate tubesheet 4a encapsulates not only the portions of the CMS membranes 21 that are adjacent the second end 23, it also encapsulates the portions of the shell 9 adjacent the second end 23 so that the permeate tubesheet 4a is contiguous with portions of the inner circumferential surface of the shell 9 adjacent the second end 23, with portions of the outer circumferential surface of the shell 9 adjacent the second end 23, and with an end face of the shell 9 adjacent the second end 23. Alternatively and as best shown in FIG. 2, the permeate tubesheet 4a does not encapsulate the portions of the shell 9 adjacent the second end 23. While it is still contiguous with an inner circumferential surface of the shell 9 adjacent the second end 23, the opposite facing outer circumferential surface of the shell 9 adjacent the second end 23 is not in contact with the material of the permeate tubesheet 4a. In other words, there is cured polymer forming the tubesheet on the inside of the shell 9 adjacent the second end 23 but not around the outside of the shell adjacent the second end 23. This alternative configuration may be formed by potting the permeate tubesheet 4a so as to encapsulate portions of the shell 9 adjacent the second end 23 followed by machining away of portions of the permeate tubesheet 4a that are adjacent to the outer circumferential surface of the shell 9.

A retentate seal is made up of a retentate seal O-ring 6b and a retentate seal O-ring groove 5b. The retentate seal is radially positioned in between an inner surface of the pressure vessel 8 and an outer, circumferential surface of the shell 9 and axially positioned in between the feed fluid inlet 19 and the retentate tubesheet 4b. In order to enhance the counter-current flow, the retentate seal is typically positioned closer to the retentate tubesheet 4b than it is to the feed fluid inlet 19. In order to provide a more effective seal, the retentate seal O-ring groove 5b is adhered, welded, or otherwise fastened to the shell 9. Those skilled in the art will recognize that other types of retentate seals known in the field of gas separation membrane technology may be used as a substitute for the retentate seal O-ring 6b and retentate seal O-ring groove 5b. Generally, in practice of the invention, the retentate seal extends around a circumference of the shell 9, is gas-impermeable, and is made of a compressible material. Those skilled in the art of gas separation membranes will recognize that while the material from which the retentate seal is made may exhibit a non-zero permeability to a gas or gases, the permeability of the material and/or the thickness of the retentate seal virtually renders the retentate seal impermeable. Collectively, the retentate seal illustrated in the FIG and others known in the field of gas separation membrane technology are known as a retentate seal means.

A permeate seal is made of a permeate seal O-ring 6a and a permeate seal O-ring groove 5a. The permeate seal is radially positioned in between an inner surface of the pressure vessel 8 and an outer, circumferential surface of the permeate tubesheet 4a. The permeate seal O-ring 6a rests in a permeate seal O-ring groove 5a that is formed or machined in the outer, circumferential surface of the permeate tubesheet 4a. Those skilled in the art will recognize that other types of permeate seals known in the field of gas separation membrane technology may be used as a substitute for the permeate seal O-ring 6a and permeate seal O-ring groove 5a, such as the seals disclosed in U.S. Pat. No. 9,737,857 B2. Collectively, the permeate seal illustrated in the FIG and others known in the field of gas separation membrane technology are known as a permeate seal means.

A porous support 15 is disposed in between the machined-away face of the permeate tubesheet 4a and the permeate end cap 2a. The porous support 15 may be made from a material that provides an adequate flow path for the fluid without irreversibly compressing under application fo pressure. A non-limiting list of suitable materials includes sintered metal powders, sintered ceramic powders, sintered metal fibers, metallic foam, woven metal mesh, or a metal, polymeric, or composite material block machined to have flow channels.

One function of the porous support 15 is to mechanically support the structure made up of the shell 9, seals, tubesheets 4a, 4b, and CMS membranes 21. Even though that structure is slidable within the pressure vessel 8 and is not fixed to either the pressure vessel 8 or the end caps 2a, 2b, due to the difference between the higher pressure side of the feed fluid in between the tubesheets 4a, 4b and the lower pressure side of the permeate in between the permeate tubesheet 4a and the permeate end cap 2a, that structure is urged towards the permeate end cap 2a. The porous support 15 mechanically supports that structure in that instance. In the absence of the porous support 15, the structure would instead abut against the permeate end cap 2a and potentially restrict flow of permeate.

Another function of the porous support 15 is to allow the permeate to flow from the bores of the CMS membranes 21 at the machined-away face of the permeate tubesheet 4a and out of the CMS membrane module via the permeate port 1a. Under the above-described pressure difference, all the stresses on the permeate tubesheet 4a and the porous support 15 are compressive. The compressive strength of the permeate tubesheet 4a and the porous support 15 is much higher than the associated tensile and shear strengths. The compression strengths of the permeate tubesheet 4a and the porous support 15 are very high to withstand pressure as high as 3000 psig. As a result, there is almost zero possibility that the permeate tubesheet 4a will separate from, or break off from, the shell 9 and cause a leak as would otherwise potentially happen in conventional CMS module designs.

In a particular advantageous feature, the inventive CMS membrane module may avoid the above-described CTE problems associated with conventional CMS membrane modules by utilizing materials having similar CTEs for the shell 9 and the tubesheets 4a, 4b. As described above, typically the tubesheets 4a, 4b are made of an epoxy which is optionally filled with inorganic or metallic particles or toughened with rubber particles and has been cured after potting. In order to draw near to the CTE value for unfilled epoxy between 50 and 75 ppm/° C. and typically around 60 ppm/° C. for unfilled epoxy, or between 30 and 70 ppm/° C. for filled epoxy whose CTE is tailored with the type and amount of the filler) of the cured epoxy, a non-limiting list materials suitable for use in the shell includes carbon fiber composite, glass fiber, reinforced polymer composite, stainless steel, aluminum, titanium, cast iron, zinc, zinc alloys, nickel-based alloys, quartz, glass, and ceramic. The CTE of carbon or glass fiber composites, in particular, may be tailored within a relatively wide range of values by changing how the fibers are arranged in the structures, the type of fiber used, the type of potting resin, and the fiber volume. The CTE of the material of the shell may be measured according to methods well known in the field of material science.

While it is not necessary to exactly match the CTEs of the tubesheets 4a, 4b and shell 9, typically, the difference between the CTE of the shell 9 (CTES) and the CTE of the permeate tubesheet 4a or retentate tubesheet 4b is no more than 45 ppm/° C. The maximum CTE mismatch (i.e., difference between the CTEs of the tubesheet and the shell depends upon the gas separation application temperature. The higher the application temperature, the smaller the maximum mismatch needs to be. Because there are fewer ways of adjusting the CTE of the material of the tubesheets 4a, 4b and the CTE of the material of the CMS membranes 21 than there are ways of adjusting the CTE of the shell 9, typically the material of the shell 9 is selected to have a CTE in the range of 5-60 ppm/° C. since the CTE of many commercial polymeric membrane module tubesheets is around 60 ppm/° C., whereas the CTE of many CMS membranes 21 is around 5 ppm/° C. This will minimize stresses and avoid or prevent possible separation and/or cracking of the tubesheets 4a, 4b, the CMS membranes 21, or shell 9, or at interface therebetween. Thus, it prevents possible stress concentrations resulting from separation or cracking and possible leaks or catastrophic structural failure.

In an optional feature, to even further reduce stresses between the CMS fibers 21 and the shell 9 in the axial direction due to CTE mismatch, the shell 9 may be made in different sections with different materials. For example, the portions of the shell 9, around which are formed the tubesheet 4a, 4b, is made of a first material selected to match the CTE of the tubesheets 4a, 4b (e.g., around 35 ppm/° C. potted with filled epoxy or around 60 ppm/° C. potted with unfilled epoxy). The tubesheets 4a, 4b could be made of an unfilled epoxy for low temperature applications up to about 80° C. and/or low pressure applications up to 200 psig applications. The tubesheets 4a, 4b could be made of a filled epoxy for high temperature applications above 80° C. and/or high pressure applications above 200 psig. On the other hand, the middle portion of the shell 9 between the tubesheets 4a, 4b may be made of a second material selected to match the CTE of the CMS membranes 21 (e.g., around 5 ppm/° C.), such as carbon fiber composite, glass fiber composite, alumina, macor, glass, titanium, Invar, or steel. If the CTE of the shell 9 matches that of the CMS membranes 21, their matching expansions and contractions in the length direction will reduce stresses upon the relatively brittle CMS membranes 21 fiber and minimize possible fiber breakage.

Figure 3:
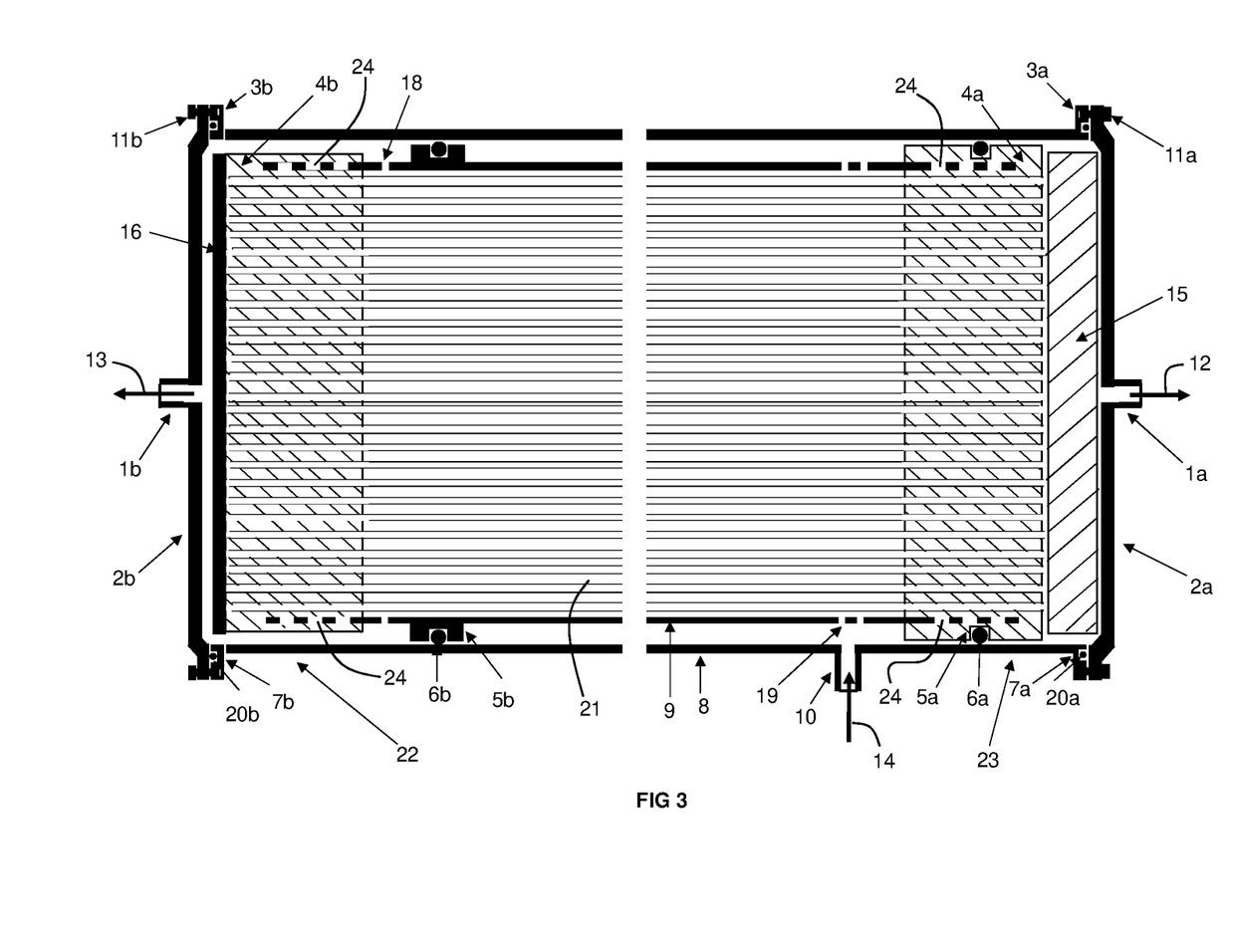
FIG. 3 is a cross-sectional schematic view of a variant of the CMS membrane module of FIG. 1.

As mentioned above, the retentate tubesheet 4b preferentially encapsulates not only the portions of the CMS membranes 21 that are adjacent the first end 22, it also encapsulates the portions of the shell 9 adjacent the first end 22 so that the retentate tubesheet 4b is contiguous with portions of the inner circumferential surface of the shell 9 adjacent the first end 22, with portions of the outer circumferential surface of the shell 9 adjacent the first end 22, and with an end face of the shell 9 adjacent the first end 22. Similarly, the permeate tubesheet 4a preferentially encapsulates not only the portions of the CMS membranes 21 that are adjacent the second end 23, it also encapsulates the portions of the shell 9 adjacent the second end 23 so that the permeate tubesheet 4a is contiguous with portions of the inner circumferential surface of the shell 9 adjacent the second end 23, with portions of the outer circumferential surface of the shell 9 adjacent the second end 23, and with an end face of the shell 9 adjacent the second end 23. A variation of this preferred configuration is illustrated in FIG. 3 wherein one or more holes 24 are formed in portions of the shell 9 that are encapsulated by the retentate tubesheet 4b and portions of the shell 9 that are encapsulated by the permeate tubesheet 4a. This enables the material of the retentate tubesheet 4b and permeate tubesheet 4a, prior to being cured, to flow through the corresponding holes 24. After curing, portions of the cured material making up the retentate and permeate tubesheets 4b, 4a form a bridge through the one or more holes 24 between remaining portions of the cured material on each side of the shell 9.

List of Reference Characters

| | |
|---|---|
| 1a | permeate port |
| 1b | retentate port |
| 2a | permeate end cap |
| 2b | retentate end cap |
| 3a | permeate cap bolt |
| 3b | retentate cap bolt |
| 4a | permeate tubesheet |
| 4b | retentate tubesheet |
| 5a | permeate seal O-ring groove |
| 5b | retentate seal O-ring groove |
| 6a | permeate seal O-ring |
| 6b | retentate seal O-ring |
| 7a | permeate side vessel O-ring groove |
| 7b | retentate side vessel O-ring groove |
| 8 | pressure vessel |
| 9 | Shell |
| 10 | feed port |
| 11a | permeation end cap nut |
| 11b | retentate end cap nut |
| 12 | flow of permeate |
| 13 | flow of retentate |
| 14 | flow of feed fluid |
| 15 | porous support |
| 16 | epoxy cap |
| 18 | retentate outlet |
| 19 | feed fluid inlet |
| 20a | permeate side vessel O-ring |
| 20b | retentate side vessel O-ring |
| 21 | CMS hollow fiber membranes |
| 22 | first end of the shell |
| 23 | second end of the shell |
| 24 | holes in portion of shell adjacent to retentate tubesheet |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A counter-current flow CMS membrane module, comprising:
a hollow, cylindrical pressure vessel having first and second open ends, an open feed port formed therein at a position closer to the second pressure vessel end than the first pressure vessel end;
a retentate end cap covering and attached to the first open end of the pressure vessel, the retentate end cap having an open retentate port formed therein;
a permeate end cap covering and attached to the second open end of the pressure vessel, the permeate end cap having an open permeate port formed therein;
a hollow cylindrical shell having first and second ends and being concentrically disposed within the pressure vessel;
a plurality of hollow fiber CMS membranes enclosed by the shell extending at least from the first end of the shell to the second end of the shell;
a cylindrical retentate tubesheet of a material, that includes a cured polymer, that encapsulates portions of the CMS membranes that are adjacent the first end of the shell and is contiguous with at least portions of an inner circumferential surface of the shell adjacent the first end to form a gas-tight seal in between the retentate tubesheet and the shell, the retentate tubesheet closing off open ends of the CMS membranes adjacent the first end of the shell;

a retentate seal means disposed between an inner surface of the pressure vessel and an outer circumferential surface of the shell closer to the first end thereof than the second end thereof;

a cylindrical permeate tubesheet of a material, that includes a cured polymer, that encapsulates portions of the CMS membranes that are adjacent the second end of the shell and is which contiguous with at least portions of an inner circumferential surface of the shell adjacent the second end, the permeate tubesheet having being machined away at a downstream face thereof adjacent the second end cap so as to expose open ends of the CMS membranes thereat;

a porous support disposed between the permeate end cap and the machined away face of the permeate tubesheet;

a permeate seal means disposed between an inner surface of the pressure vessel and an outer circumferential surface of the permeate tubesheet, wherein:

one or more openings are formed in the shell between the first and second seals to form a feed fluid inlet; and one or more openings are formed in the shell between the retentate seal and the retentate tubesheet to form a retentate outlet.

2. The CMS membrane module of claim 1, wherein the seals are slidable along the inner surface of the pressure vessel and none of the tubesheets and seals are fixed in place in relation to the pressure vessel and end caps.

3. The CMS membrane module of claim 2, wherein:
a portion of the shell around which is formed the retentate tubesheet is made of a material that has an associated $CTE_{RS}$;
a portion of the shell around which is formed the permeate tubesheet is made of a material that has an associated $CTE_{PS}$;
the material of the retentate tubesheet has an associated $CTE_{RTS}$;
the material of the permeate tubesheet has an associated $CTE_{PTS}$;
a difference between $CTE_{RS}$ and $CTE_{RTS}$ is no more than 60 ppm/° C.; and
a difference between $CTE_{PS}$ and $CTE_{PTS}$ is no more than 60 ppm/° C.

4. The CMS membrane module of claim 3, wherein a middle portion of the shell between the retentate and permeate tubesheets is made of a material having a $CTE_M$ that is lower than $CTE_{RS}$ and $CTE_{PS}$.

5. The CMS membrane module of claim 2, wherein:
the shell is made of a material has an associated $CTE_S$;
the material of the retentate tubesheet has an associated $CTE_{RTS}$;
the material of the permeate tubesheet has an associated $CTE_{PTS}$;
a difference between $CTE_S$ and $CTE_{RTS}$ is no more than 60 ppm/° C.; and
a difference between $CTE_S$ and $CTE_{PTS}$ is no more than 60 ppm/° C.

6. The CMS membrane module of claim 5, wherein the material of the shell is carbon fiber composite, glass fiber composite, a pure metal, or a metal alloy.

7. The CMS membrane module of claim 1, wherein:
a portion of the shell around which is formed the retentate tubesheet is made of a material that has an associated $CTE_{RS}$;
a portion of the shell around which is formed the permeate tubesheet is made of a material that has an associated $CTE_{PS}$;
the material of the retentate tubesheet has an associated $CTE_{RTS}$;
the material of the permeate tubesheet has an associated $CTE_{PTS}$;
a difference between $CTE_{RS}$ and $CTE_{RTS}$ is no more than 60 ppm/° C.; and
a difference between $CTE_{PS}$ and $CTE_{PTS}$ is no more than 60 ppm/° C.

8. The CMS membrane module of claim 7, wherein a middle portion of the shell between the tubesheets is made of a material having a $CTE_M$ that is lower than $CTE_{RS}$ and $CTE_{PS}$.

9. The CMS membrane module of claim 1, wherein:
the shell is made of a material has an associated $CTE_S$;
the material of the retentate tubesheet that has an associated $CTE_{RTS}$;
the material of the permeate tubesheet has an associated $CTE_{PTS}$;
a difference between $CTE_S$ and $CTE_{RTS}$ is no more than 60 ppm/° C.; and
a difference between $CTE_S$ and $CTE_{PTS}$ is no more than 60 ppm/° C.

10. The CMS membrane module of claim 9, wherein the material of the shell is selected from carbon fiber composite, glass fiber composite, a pure metal, and a metal alloy.

11. The CMS membrane module of claim 1, wherein the material of the shell has a $CTE_S$ that is in the range of 5-35 ppm/° C.

12. The CMS membrane module of claim 11, wherein the material of the shell is selected from carbon fiber composite, glass fiber composite, a pure metal, and a metal alloy.

13. The CMS membrane module of claim 1, wherein said module has no hollow center tube extending along an axis of the pressure vessel within the CMS membranes.

14. The CMS membrane module of claim 1, wherein:
said retentate seal means comprises an O-ring or lip seal that is adjacent the inner surface of the pressure vessel that rests in grooved ring that is secured to the outer circumferential surface of the shell; and
said permeate seal means comprises an O-ring or lip seal that is adjacent the inner surface of the pressure vessel that rests in a groove formed in an outer circumferential surface of the permeate tubesheet.

15. The CMS membrane module of claim 1, wherein the retentate tubesheet does not encapsulate the portions of the shell adjacent the first end.

16. The CMS membrane module of claim 1, wherein the retentate tubesheet encapsulates portions of the shell adjacent the first end so that the retentate tubesheet is contiguous with: a) portions of an inner circumferential surface of the shell adjacent the first end, b) portions of an outer circumferential surface of the shell adjacent the first end, and c) with an end face of the shell adjacent the first end.

17. The CMS membrane module of claim 1, wherein the permeate tubesheet does not encapsulate the portions of the shell adjacent the first end.

18. The CMS membrane module of claim 1, wherein the permeate tubesheet encapsulates portions of the shell adjacent the first end so that the permeate tubesheet is contiguous with: a) portions of an inner circumferential surface of the shell adjacent the first end, b) portions of an outer circumferential surface of the shell adjacent the first end, and c) with an end face of the shell adjacent the first end.

19. The CMS membrane module of claim 1, wherein:

the retentate tubesheet encapsulates portions of the shell adjacent the first end so that the retentate tubesheet is contiguous with: a) portions of an inner circumferential surface of the shell adjacent the first end, b) portions of an outer circumferential surface of the shell adjacent the first end, and c) with an end face of the shell adjacent the first end the permeate tubesheet encapsulates portions of the shell adjacent the first end so that the permeate tubesheet is contiguous with: a) portions of an inner circumferential surface of the shell adjacent the first end, b) portions of an outer circumferential surface of the shell adjacent the first end, and c) with an end face of the shell adjacent the first end;

one or more holes are formed in portions of the shell that are encapsulated by the retentate tubesheet;

one or more holes are formed in portions of the shell that are encapsulated by the permeate tubesheet;

portions of the cured material making up the retentate tubesheet forms a bridge through the one or more holes between remaining portions of the cured material on each side of the shell; and portions of the cured material making up the permeate tubesheet forms a bridge through the one or more holes between remaining portions of the cured material on each side of the shell.

20. A method of separating a fluid using the countercurrent flow CMS membrane module of claim 1, comprising the steps of feeding a feed fluid to the feed port, withdrawing a permeate fluid from the permeate port, and withdrawing a retentate fluid from the retentate port, wherein, in use:

a feed fluid enters the pressure vessel via the feed port and travels through an annular space between an inner surface of the pressure vessel and an outer surface of the shell that extends between the first and second seals, the feed fluid enters the shell interior via the feed fluid inlet, some of the feed fluid permeates across walls of the CMS membranes and enters bores of the CMS membranes as permeate, the permeate travels down the bores of the CMS membranes in a direction from the retentate tubesheet toward the permeate tubesheet, the permeate exits the open ends of the CMS membranes and exits the CMS membrane module via the porous support and permeate port, a remainder of the feed fluid flows between the CMS membranes in a direction from the permeate tubesheet towards the retentate tubesheet and exits the shell at the retentate outlet as retentate, and the retentate exits said CMS membrane module via the retentate port.

* * * * *